(12) United States Patent
Pietryga

(10) Patent No.: US 6,550,845 B1
(45) Date of Patent: Apr. 22, 2003

(54) SIDE DOOR ASSEMBLY FOR VEHICLES

(75) Inventor: Brad L Pietryga, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/041,773

(22) Filed: Jan. 8, 2002

(51) Int. Cl.$^7$ ................................................ B60J 5/00
(52) U.S. Cl. .............................. 296/146.1; 296/146.11; 16/334; 16/335; 16/366; 16/370
(58) Field of Search ......................... 296/146.1, 146.11; 16/366, 370, 335, 334

(56) References Cited

U.S. PATENT DOCUMENTS

| | | | | |
|---|---|---|---|---|
| 4,719,665 A | * | 1/1988 | Bell ........................... | 16/366 |
| 4,930,836 A | | 6/1990 | Grinn ......................... | 296/146 |
| 5,282,293 A | * | 2/1994 | Pedoeem ..................... | 16/366 |
| 5,561,887 A | * | 10/1996 | Neag et al. .................. | 16/334 |
| 5,685,046 A | * | 11/1997 | Neag et al. .................. | 16/334 |
| 5,749,611 A | * | 5/1998 | Watson et al. ........... | 292/336.3 |
| 5,915,441 A | * | 6/1999 | Schlack ........................ | 16/334 |
| 6,053,561 A | * | 4/2000 | Hojnowski et al. ..... | 296/146.11 |

* cited by examiner

Primary Examiner—D. Glenn Dayoan
Assistant Examiner—Lori L Coletta
(74) Attorney, Agent, or Firm—Laura C. Hargitt

(57) ABSTRACT

A side door assembly for a vehicle includes a front pillar extending between a roof and a floor of a vehicle body of the vehicle. The side door assembly also includes a rear pillar extending between the roof and the floor and spaced longitudinally from the front pillar to define a continuous door opening in the vehicle body. The side door assembly includes a front side door having a rear end and a forward end pivotally connected to the front pillar to open and close a front portion of the door opening. The side door assembly also includes a rear side door having a forward end and a rear end. The side door assembly further includes at least one hinge assembly connected to the rear end of the rear side door and connected to the rear pillar and having a dual pivot to allow the rear side door to pivot to a first open position and a second open position and to a closed position relative to a rear portion of the door opening.

11 Claims, 5 Drawing Sheets

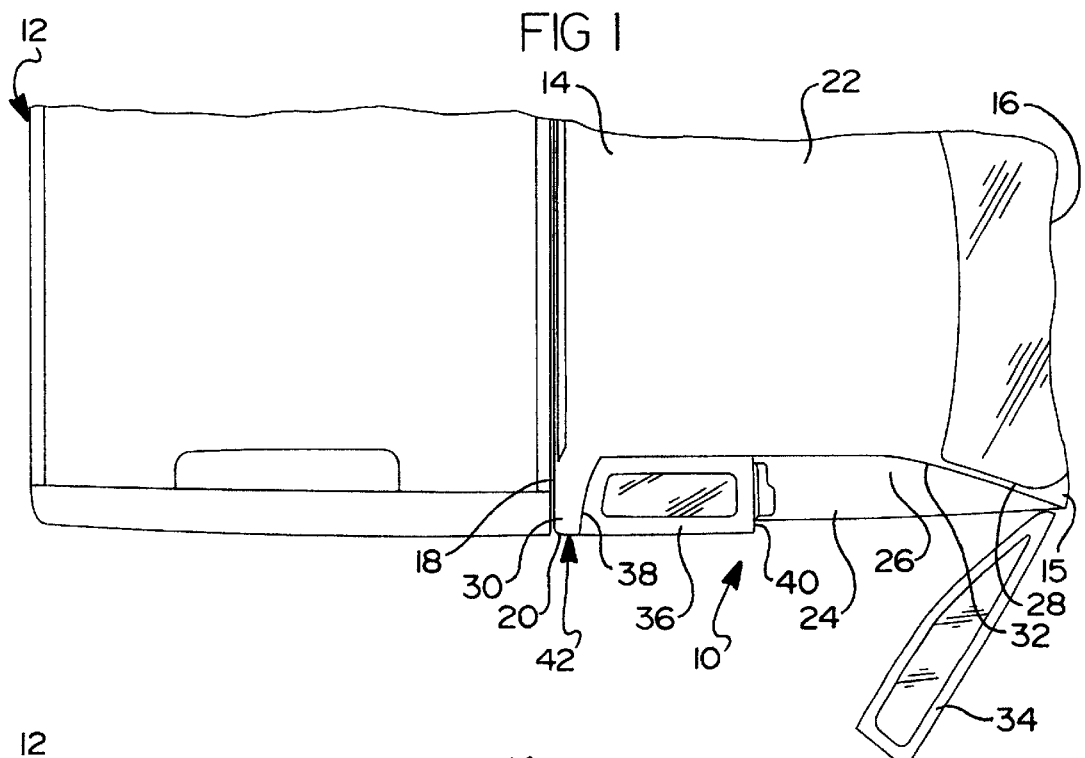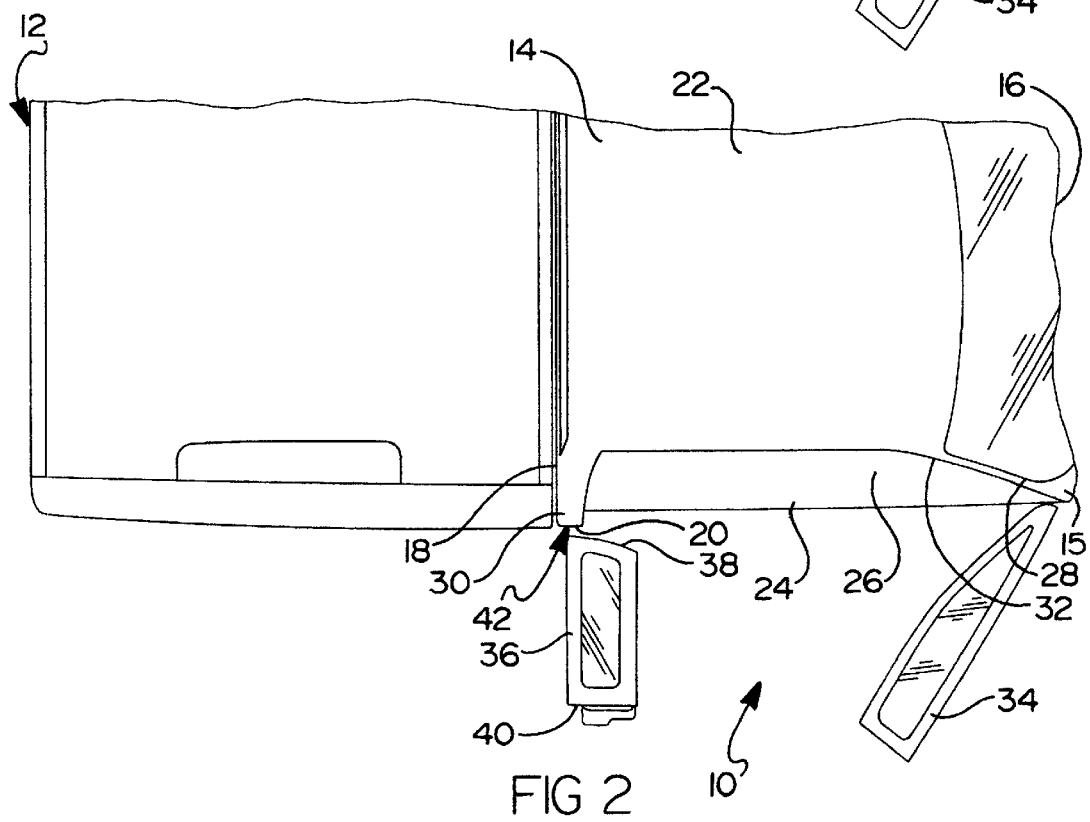

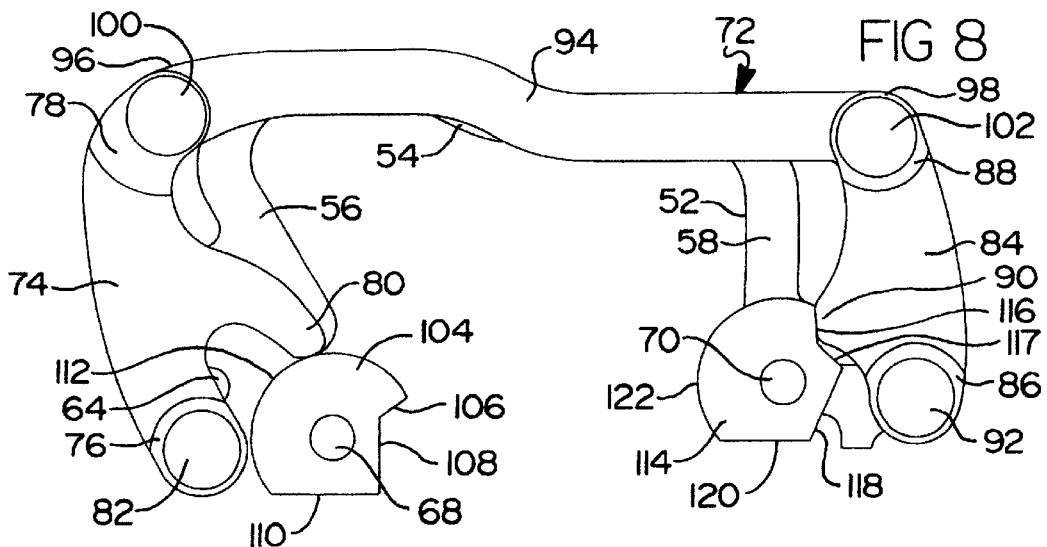
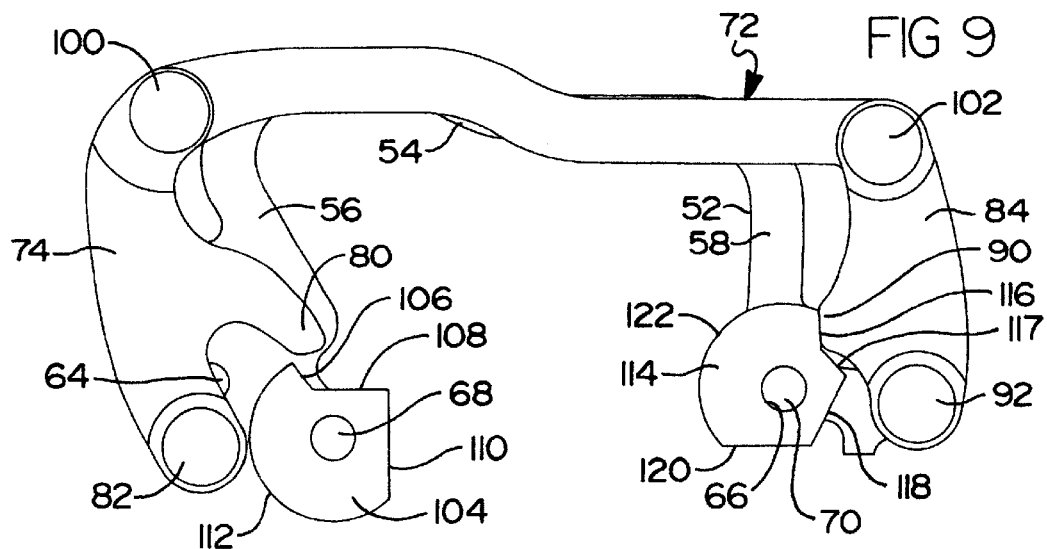
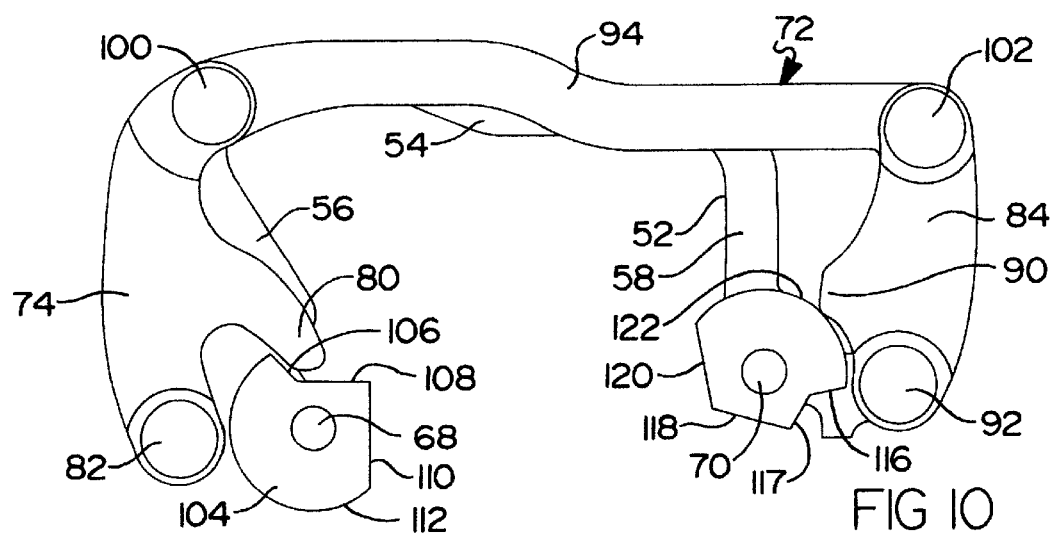

SIDE DOOR ASSEMBLY FOR VEHICLES

TECHNICAL FIELD

The present invention relates generally to doors for vehicles and, more particularly, to a side door assembly for a vehicle.

BACKGROUND OF THE INVENTION

It is known to provide a door assembly for an opening in a vehicle body of a vehicle. An example of such a door assembly is disclosed in U.S. Pat. No. 4,930,836 to Grinn. A side of a cab portion of a pick-up truck is opened by a continuous aperture extending longitudinally from a front pillar structure to a rear pillar structure. A front door and a rear door together form a door assembly in the cab portion and are swingably mounted on the cab portion to move between positions opening and closing the continuous aperture. However, similar door assemblies typically use exposed hinges that require a release of a hold open mechanism to allow movement past ninety-degree (90°). The exposed hinges are undesirable from a styling and corrosion standpoint.

In addition, these door assemblies do not allow easy access into the vehicle in a parking lot trap condition. The parking lot trap condition exists when the vehicle is in a confined cross car space. When the front or leading door is opened pivoting on its forward edge, the rear or trailing door that is dependent on the front door then opens, pivoting on its rearward edge. With both doors opened and the vehicle parked along side of another vehicle or structure, access to the vehicle is blocked. This results in the occupant having to think of creative ways to load occupants and cargo into the cab portion that involve multiple handling of the same cargo and additional cycling of the front and rear doors, which is undesired.

Therefore, it is desirable to eliminate exposed hinges and manual door checks for a door assembly of a vehicle. It is also desirable to improve access to the rear passenger/cargo area of a vehicle such as a pickup truck in confined cross-car spaces. Thus, there is a need in the art to provide a side door assembly for a vehicle that meets these desires.

SUMMARY OF THE INVENTION

It is, therefore, one object of the present invention to provide a new side door assembly for a vehicle.

It is another object of the present invention to provide a side door assembly for a vehicle that has improved styling/vehicle appearance and corrosion performance.

It is yet another object of the present invention to provide a side door assembly for a vehicle that improves access to the vehicle in cross car confined situations.

To achieve the foregoing objects, the present invention is a side door assembly for a vehicle. The side door assembly includes a front pillar extending between a roof and a floor of a vehicle body of the vehicle. The side door assembly also includes a rear pillar extending between the roof and the floor and spaced longitudinally from the front pillar to define a door opening in the vehicle body. The side door assembly includes a front side door having a rear end and a forward end pivotally connected to the front pillar to open and close a front portion of the door opening. The side door assembly also includes a rear side door having a forward end and a rear end. The side door assembly further includes at least one hinge assembly connected to the rear end of the rear side door and connected to the rear pillar and having a dual pivot to allow the rear side door to pivot to a first open position and a second open position and to a closed position relative to a rear portion of the door opening.

One advantage of the present invention is that a new side door assembly is provided for a vehicle. Another advantage of the present invention is that the side door assembly improves access to the vehicle in cross car confined situations like parking lots and garages. Yet another advantage of the present invention is that the side door assembly improves corrosion performance and improved styling/vehicle appearance. Still another advantage of the present invention is that the side door assembly provides minimal impact to manufacturing and neighboring vehicle systems. A further advantage of the present invention is that the side door assembly improves access to the rear passenger/cargo area of pick-up trucks in confined cross-car spaces.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a plan view of a side door assembly, according to the present invention, illustrated in a first operational position with a vehicle.

FIG. 2 is a view similar to FIG. 1 illustrating a second operational position.

FIG. 8 is a plan view of the hinge assembly illustrating a first operational position.

FIG. 9 is a view similar to FIG. 8 illustrating the hinge assembly in a second operational position.

FIG. 10 is a view similar to FIG. 8 illustrating the hinge assembly in a third operational position.

DESCRIPTION OF THE PREFERRED EMBODIMENT

Figure 3:
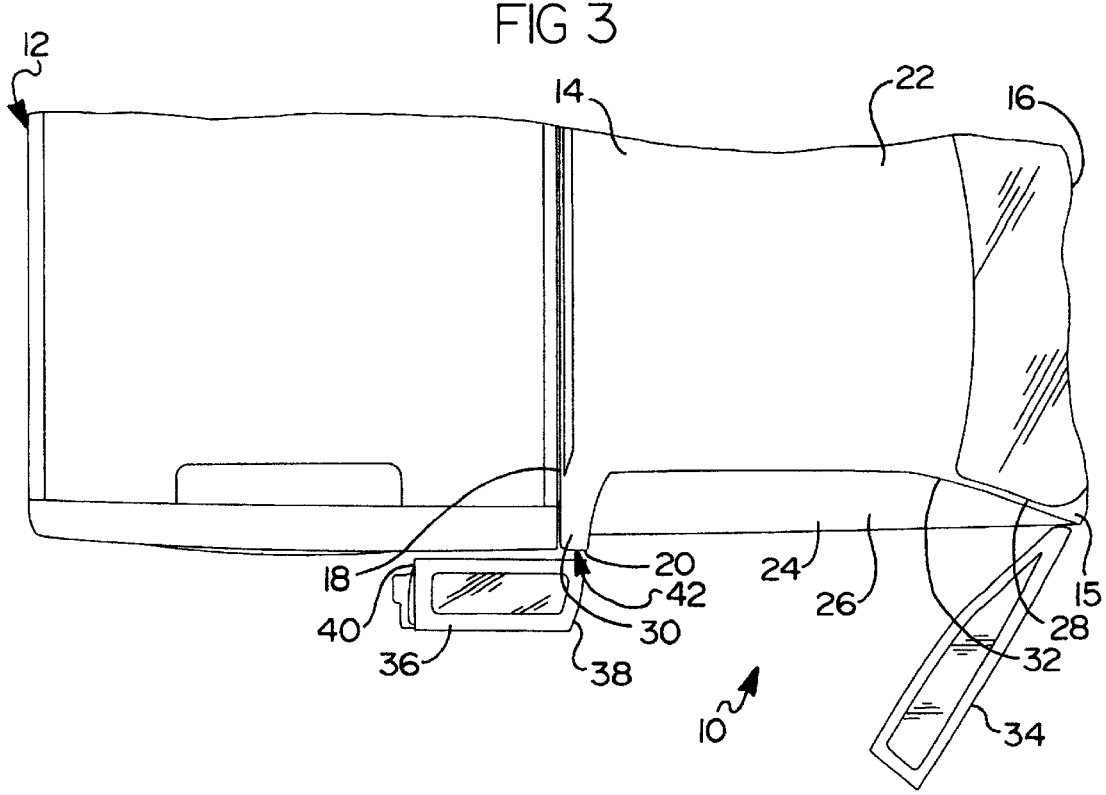
FIG. 3 is a view similar to FIG. 1 illustrating a third operational position.

Referring to the drawings and in particular FIGS. 1 through 3, one embodiment of a side door assembly 10, according to the present invention, is shown for a vehicle, such as a pickup truck type motor vehicle, generally indicated at 12. The vehicle 12 includes a vehicle body 14 (partially shown) having a cab portion 15 with a forward end 16 (partially shown), a rear end 18, and a pair of sides 20 (only one shown) spaced laterally and extending longitudinally between the forward end 16 and the rear end 18. The vehicle body 14 also includes a roof 22 and a floor 24 attached to the sides 20 to form an occupant compartment 26 therein.

Referring to FIGS. 1 through 3, the vehicle 12 includes at least one side 20 of the vehicle body 14 having a forward or "A" pillar 28 and a rear or "C" pillar 30 spaced longitudinally and extending generally vertically between the roof 22 and the floor 24 of the vehicle body 14. The vehicle 12 includes a continuous and pillarless side door opening 32 in the side 20 of the vehicle body 14 extending longitudinally between the pillars 28 and 30 and vertically between the roof 22 and the floor 24. The vehicle 12 also includes a front side door 34 disposed in and closing a front or first portion of the door opening 32. The front side door 34 faces rearward or toward the rear end 18 of the cab portion 15 of the vehicle body 14 and is attached at its forward end to the front pillar 28 by suitable means such as upper and lower hinges (not shown). It should be appreciated that the front side door 34 is conventional and known in the art.

Figure 4:
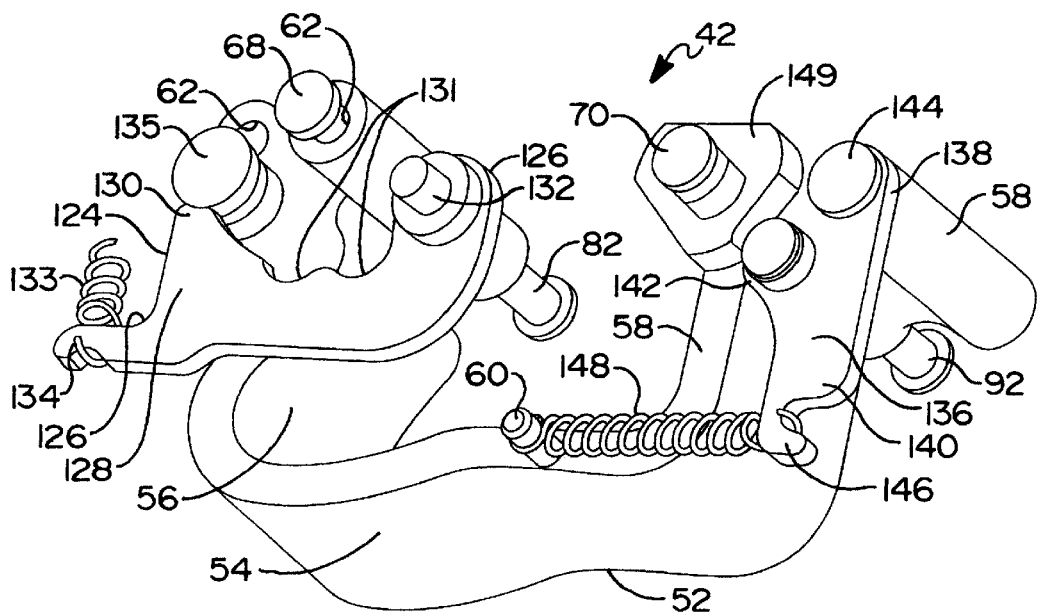
FIG. 4 is a bottom perspective view of a hinge assembly of the side door assembly of FIG. 1.

The side door assembly 10 further includes a second or forward facing rear side door 36 disposed in and closing a rear or second portion of the door opening 32. The rear side door 36 faces forward or toward the front end 16 of the cab portion 15 of the vehicle body 14. The rear side door 36 has a rear end 38 adjacent the rear pillar 30 and a forward end 40 adjacent a rear end of the front side door 34. The rear end 38 of the rear side door 36 is attached to the rear pillar 30 by at least one hinge assembly, generally indicated at 42 (FIG. 4), to be described. The side door assembly 10 further includes a striker or latch member (not shown) attached to the forward end 40 of the rear side door 36 for engagement and disengagement with a latch (not shown) on a rear end 48 of the front side door 34. It should be appreciated that the latch member and latch are conventional and known in the art. It should also be appreciated that the front side door 34 and rear side door 36 are joined together in a pillarless manner. It should further be appreciated that the side door assembly 10 may include a handle (not shown) on the forward end of the rear side door 36 to actuate latches (not shown) on the rear side door 36 which engage and disengage a roof rail and a rocker panel of the vehicle body 14.

Referring to FIGS. 4 through 10, the side door assembly 10 includes at least one, preferably a plurality of, hinge assemblies, generally indicated at 42, for attaching the rear side door 36 to the vehicle body 14. Each hinge assembly 42 includes a body bracket 44 connected to a body mount surface 46 of the rear pillar 30 by suitable means such as fasteners (not shown). The hinge assembly 42 also includes a door bracket 48 connected to a door mount surface 50 of the rear end 38 of the rear side door 36 by suitable means such as fasteners (not shown).

The hinge assembly 42 includes a hinge arm 52 operatively interconnecting the body bracket 44 and the door bracket 48. The hinge arm 52 has a base portion 54 extending longitudinally and a body end portion 56 extending laterally from one end of the base portion 54 and a door end portion 58 extending laterally from the other end of the base portion 54 to form a generally "C" shaped configuration. The base portion 54 includes a door side detent spring pin 60 extending outwardly therefrom for a function to be described. The body end portion 56 includes at least one, preferably a plurality of apertures 62 extending therethrough for a function to be described. The body end portion 56 also includes a pivot control spring pin 64 extending outwardly therefrom for a function to be described. The door end portion 58 includes at least one, preferably a plurality of apertures 66 extending therethrough for a function to be described. The hinge arm 52 is made of a metal material such as steel. The hinge arm 52 is a monolithic structure being integral, unitary, and one-piece.

The hinge assembly 42 includes a first or body side pivot pin 68 extending through one of the apertures 62 in the body end portion 56 and a corresponding aperture (not shown) in the body bracket 44 to pivotally connect the hinge arm 52 to the body bracket 44. The hinge assembly 42 includes a second or door side pivot pin 70 extending through one of the apertures 66 in the door end portion 58 and a corresponding aperture (not shown) in the door bracket 46 to pivotally connect the hinge arm 52 to the door bracket 46. It should be appreciated that the pins 68 and 70 are securely held in place by suitable means such as fasteners (not shown) and allow rotation of the hinge arm 52 relative to the body bracket 44 and door bracket 46.

The hinge assembly 42 also includes a pivot control assembly, generally indicated at 72, operatively connected to the hinge arm 52. The pivot control assembly 72 includes a body pivot lever or member 74 pivotally connected to the body end portion 56 of the hinge arm 44. The body pivot member 74 has a first end 76 and a second end 78. The body pivot member 74 has a projection or flange 80 extending outwardly toward the first end 76 for a function to be described. The pivot control assembly 72 includes a pin 82 extending through the first end 76 and one of the apertures 62 in the body end portion 56 of the hinge arm 52 to pivotally connect the body pivot member 74 to the hinge arm 52. It should be appreciated that the pin 82 is securely held in place by retainers (not shown) and allows rotation of the body pivot member 74 relative to the hinge arm 52.

The pivot control assembly 72 includes a door pivot lever or member 84 pivotally connected to the door end portion 58 of the hinge arm 52. The door pivot member 84 has a first end 86 and a second end 88. The door pivot member 84 has a projection or flange 90 extending outwardly toward the first end 86 for a function to be described. The pivot control assembly 72 includes a pin 92 extending through the first end 86 and one of the apertures 66 in the door end portion 58 of the hinge arm 52 to pivotally connect the door pivot member 84 to the hinge arm 52. It should be appreciated that the pin 92 is securely held in place by retainers (not shown) and allows rotation of the door pivot member 84 relative to the hinge arm 52.

The pivot control assembly 72 includes a control link or member 94 pivotally connected to the body pivot member 74 and the door pivot member 84. The control member 94 has a first end 96 and a second end 98. The pivot control assembly 72 includes a pin 100 extending through the second end 78 of the body pivot member 74 and the first end 96 of the control member 94 to pivotally connect the control member 94 to the body pivot member 74. The pivot control assembly 72 includes a pin 102 extending through the second end 88 of the door pivot member 84 and the second end 98 of the control member 94 to pivotally connect the control member 94 to the door pivot member 84. It should be appreciated that the pivot control assembly 72 pivots relative to the hinge arm 52.

The hinge assembly 42 includes a body side cam 104 centered on or disposed about the pin 68 and rigidly attached to the body bracket 44 by suitable means such as welding. The body side cam 104 is generally circular in shape and has a first cam surface 106 extending radially inward at an angle, and a second cam surface 108 and a third cam surface 110 forming a ninety degree angle. The body side cam 104 also has an arcuate outer surface 112 between the first cam surface 106 and the third cam surface 110. The body side cam 104 and pin 68 form a body side or first pivot for the hinge assembly 42. It should be appreciated that the hinge arm 52 and body pivot member 74 rotate relative to the body side cam 104 and body bracket 44. It should also be appreciated that the body pivot member 74 is spring loaded against the body side cam 104 by a spring 113 (FIG. 5) such as a mousetrap spring mounted about the pivot control spring pin 64 and having one end connected to body pivot member 74 and the other end contacting the hinge arm 52 to return the body pivot member 74 to the zero (0°) to ninety (90°) degree position and keeps tension on the entire pivot control assembly 72, preventing rattling.

The hinge assembly 42 includes a door side cam 114 centered on or disposed about the pin 70 and rigidly attached to the door bracket 48 by suitable means such as welding. The door side cam 114 is generally circular in shape and has a first cam surface 116 extending radially inward at an angle, and a second cam surface 117 extending radially outward at an angle, a third cam surface 118 and a fourth cam surface 120 forming a ninety degree angle. The door side cam 114 also has an, arcuate outer surface 122 between the first cam surface 116 and the fourth cam surface 120. The door side cam 114 and pin 70 form a door side or second pivot for the hinge assembly 42. It should be appreciated that the hinge arm 52 and door pivot member 84 rotate relative to the door side cam 114 and door bracket 48.

The hinge assembly 42 includes a body side detent arm 124 pivotally connected to the body bracket 44. The body side detent member 124 has a first end 126 and a second end 128. The body pivot member 124 has a projection or flange 130 extending outwardly toward the first end 126 for a function to be described. The body side member 124 has at least one, preferably a plurality of recesses 131 for a function to be described. The hinge assembly 42 includes a pin 132 extending through the first end 126 and an aperture (not shown) in the body bracket 44 to pivotally connect the body side detent member 124 to the body bracket 44. The body side detent member 124 also has a tension spring hook 134 extending outwardly from the second end 128. It should be appreciated that a spring 133 (FIG. 4) interconnects the tension spring hook 134 and the body bracket 44. It should also be appreciated that the flange 130 and recesses 131 engage a roller 135 on the hinge arm 52. It should further be appreciated that the body side detent member 124 provides detent function at the ninety-degree (90°) position and the sixty-degree (60°) position.

The hinge assembly 42 includes a door side detent member 136 pivotally connected to the door end portion 58 of the hinge arm 52. The door side detent member 136 has a first end 138 and a second end 140. The door side detent member 136 has a roller 142 extending outwardly for a function to be described. The hinge assembly 42 includes a pin 144 extending through the first end 138 and one of the apertures 66 in the door end portion 58 of the hinge arm 52 to pivotally connect the door side detent member 136 to the hinge arm 44. The door side detent member 136 also has a tension spring hook 146 extending outwardly from the second end 140. It should be appreciated that a spring 148 interconnects the tension spring hook 146 and the door side detent spring pin 60. It should also be appreciated that the roller 142 engages a detent cam 149 rigidly secured to the door bracket 48 to provide detent function at ninety-degrees (90°) (pivot transition) and from approximately one hundred sixty degrees (160°) to a full open position of approximately one hundred eighty degree (180°). It should further be appreciated that the hinge assembly 42 is hidden from view by an outer body panel 150 and opens at approximately ninety-degree (90°) and approximately one hundred eighty degree (180°) positions. It should still further be appreciated that the body side detent member 124 and door side detent member 136 are used to disguise the pivot transition.

In addition, the body bracket 44 has a flange 152 with a projection (not shown) that engages the hinge arm 52 at approximately the ninety degrees (90°) position and acts as a stop for the hinge arm 52. The door bracket 48 includes a flange 152 that engages the hinge arm 52 at approximately the one hundred eight degree (180°) position and acts as a stop for the hinge arm 52.

Figure 5:
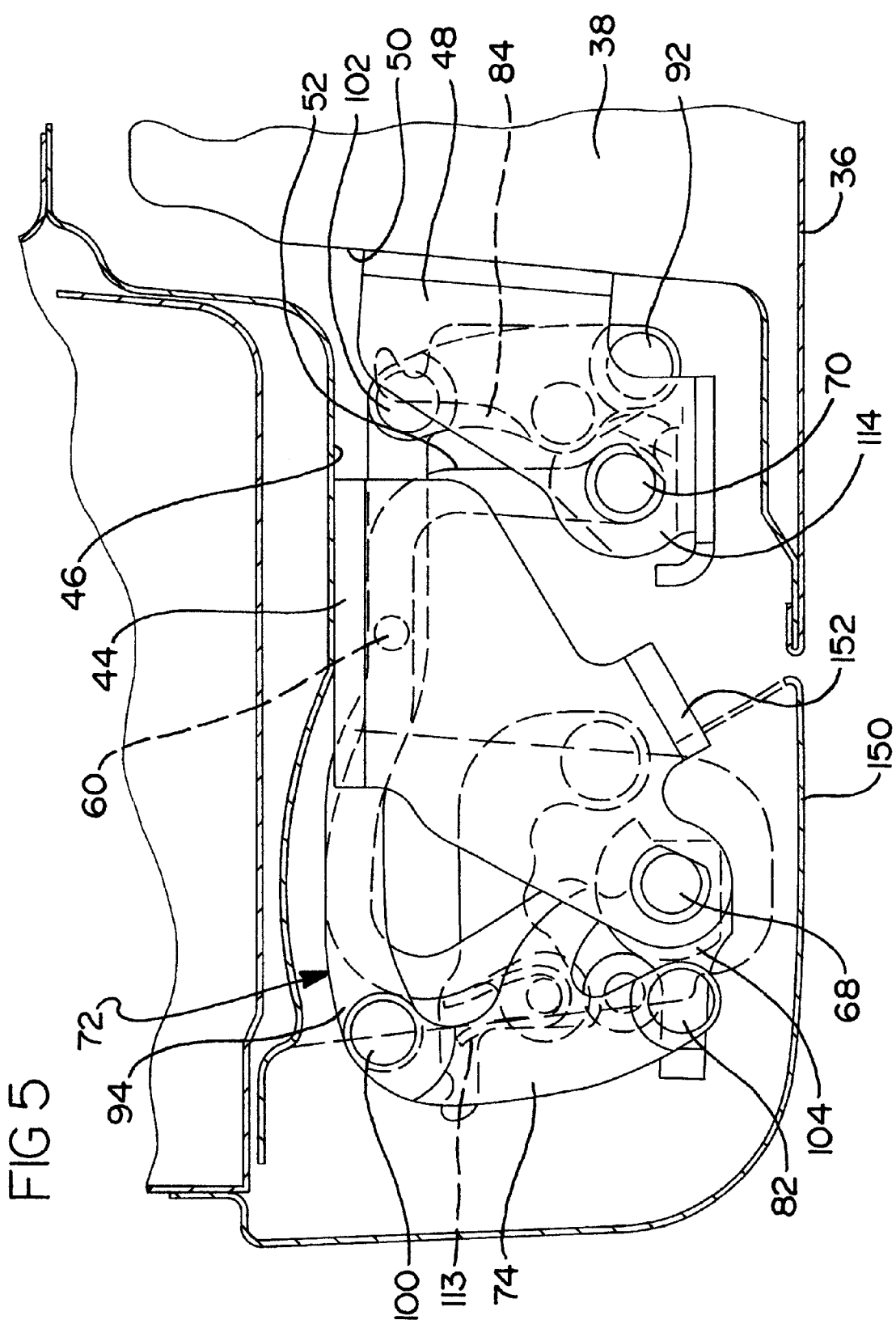
FIG. 5 is a partial fragmentary plan view of the hinge assembly of FIG. 1 illustrated in a first operational position.

In operation, to open the front side door 34, a handle upon the front side door 34 is actuated to release the latch from the latch member and the front side door 34 is pivoted outwardly and forwardly as illustrated in FIG. 1. The rear side door 36 is in a closed position as illustrated in FIG. 1. When the rear side door 36 is in the closed position, the hinge assembly 42 is in a closed position as illustrated in FIGS. 5 and 8. In the closed position, the projection 90 of the door pivot member 84 extends toward and engages the first cam surface 116 of the door side cam 114 to block the door side or second pivot about the pin 70 as illustrated in FIG. 8. It should be appreciated that pivot control is accomplished with the cams 104 and 114 rigidly attached to the brackets 44 and 48 and members 74 and 84 are pin connected by a ridged control member 94 and that the members 74 and 84 attached by pins 82,92 and pivot the hinge arm 52.

Figure 6:
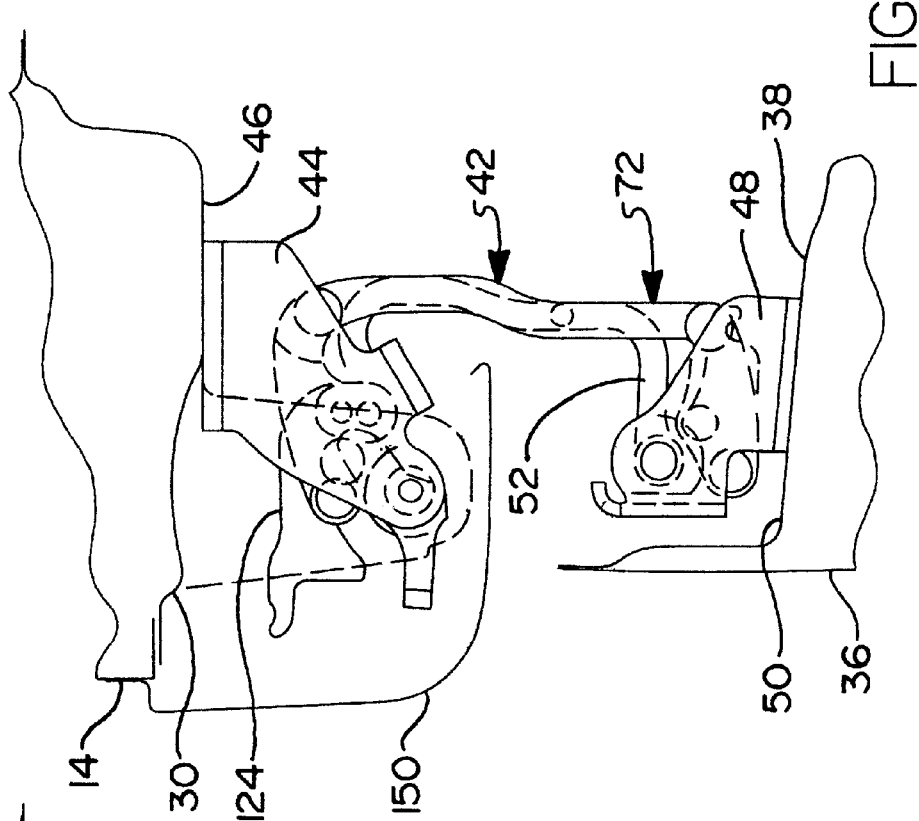
FIG. 6 is a partial fragmentary plan view of the hinge assembly illustrating a second operational position.

To open the rear side door 36, the handle upon the rear side door 36 is actuated to release latches, (not shown) and the rear side door 36 is pivoted outwardly and rearwardly to a first open position of approximately ninety-degree (90°) as illustrated in FIG. 2. When the rear side door 36 is in the first open position, the hinge assembly 42 is in a first open position as illustrated in FIGS. 6 and 8. In the first open position, the projection 80 of the body pivot member 74 extends toward and engages the arcuate outer surface 112 of the body side cam 104 to activate the first pivot about the pin 68 and the projection 90 of the door pivot member 84 extends toward and engages the first cam surface 116 of the door side cam 114 to block the second pivot about the pin 70 as illustrated in FIG. 8. It should be appreciated that a cable (not shown) is connected to a fuel door (not shown) and to the body pivot member 74 to block the fuel door from opening if the side door 36 is rotated past the ninety-degree (90°) position.

As the side door 36 rotates about the door side pivot past ninety degrees (90°), the door side cam 114 drives the rotation of the door side member 84. The door side member 84 is connected by the ridged control member 94 to the body side member 74, resulting in rotation of the body side member 74. As the body side member 74 rotates, it blocks the body side or first pivot as illustrated in FIG. 9. If the door 36 is rotated past ninety (90°) degree, the first pivot is blocked by the projection 80 engaging the first cam surface 106 and the second pivot is active as illustrated in FIG. 10. It should be appreciated that the hinge assembly 42 allows only one active pivot at a time. It should also be appreciated that the body side or first pivot is active from zero degree (0°) to ninety-degree (90°). It should further be appreciated that the door side or second pivot is prevented from rotating by the door side member 84 which cannot rotate to allow freedom of the door side or second pivot until the hinge arm 52 and body side member 74 are at the ninety degree (90°) position. It should still further be appreciated that, at the ninety-degree (90°) position, the body side cam 104 allows rotation of the body side member 74 driven by additional open force applied to the rear side door 36.

Figure 7:
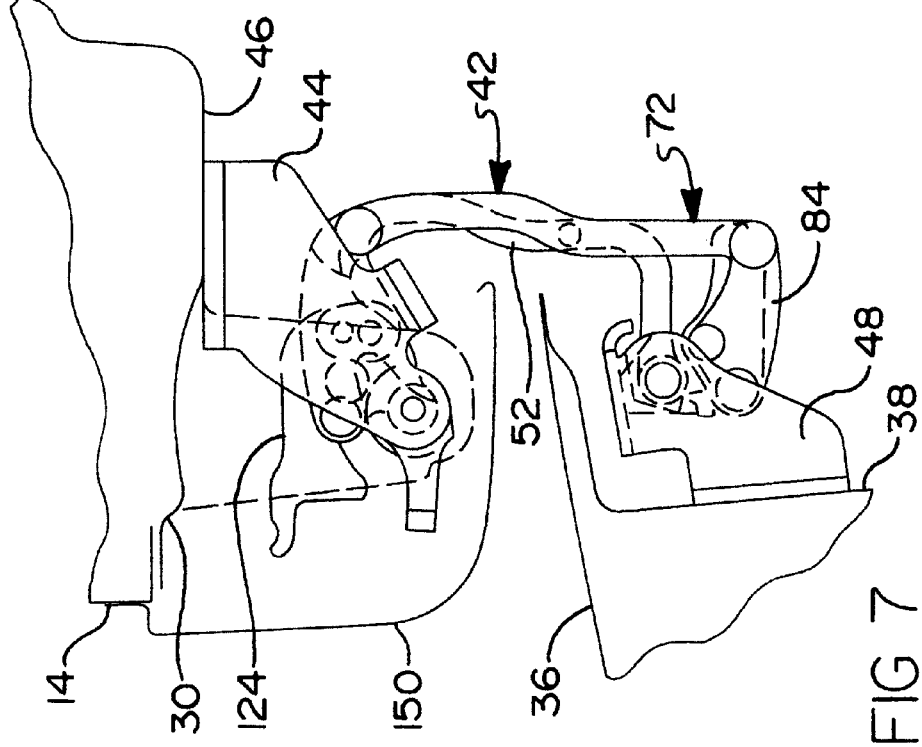
FIG. 7 is a view similar to FIG. 6 illustrating a third operational position.

To open the rear side door 36 further, additional force is applied to the rear side door 36 and the rear side door 36 is pivoted outwardly and rearwardly to a second open position of approximately one hundred sixty degree (160°) to approximately one hundred seventy degree (170°) as illustrated in FIG. 3. When the rear side door 36 is in the second open position, the hinge assembly 42 is in a second open position as illustrated in FIGS. 7 and 10. In the second open position, the projection 80 of the body pivot member 74 extends toward and engages the first cam surface 106 of the body side cam 104 to block the body or first pivot about the pin 68 and the projection 90 of the door pivot member 84 extends toward and engages the arcuate outer surface 122 of the door side cam 114 to activate the door side or second pivot about the pin 70 as illustrated in FIG. 10. The hinge assembly 42 opens approximately 180° in two increments, first 90° on the body side pivot, and then by applying additional opening force, it opens to a full 180° on the door side pivot. The operation is reversed for closing the doors 36 and 34. It should be appreciated that, in the second open position, the rear side door 36 is positioned to fold substantially flat against the vehicle body 14 and allows access between the rear of the vehicle 12 and the occupant compartment 26 of the vehicle 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A side door assembly for a vehicle comprising:

a front pillar extending between a roof and a floor of a vehicle body of the vehicle;

a rear pillar extending between the roof and the floor and spaced longitudinally from said front pillar to define a continuous door opening in the vehicle body;

a front side door having a rear end and a forward end pivotally connected to said front pillar to open and close a front portion of said door opening;

a rear side door having a forward end and a rear end;

at least one hinge assembly connected to said rear end of said rear side door and connected to said rear pillar and having a dual pivot to allow said rear side door to pivot to a first open position and a second open position and to a closed position relative to a rear portion of said door opening;

wherein said at least one hinge assembly comprises a door bracket mounted to said rear side door and a body side bracket mounted to the rear pillar, a body side cam mounted to said body side bracket, a door side cam mounted to said door side bracket, a hinge arm interconnecting said body side cam and said door side cam, a body side member pivotally connected to one end of said hinge arm and a door side member pivotally connected to another end of said hinge arm.

2. A side door assembly as set forth in claim 1 including a rigid control member interconnecting said body side member and said door side member.

3. A side door assembly as set forth in claim 1 wherein said body side member includes a projection cooperating with said body side cam to block and activate a first pivot for said rear side door.

4. A side door assembly as set forth in claim 1 wherein said door side member includes a projection cooperating with said door side cam to block and activate a second pivot for said rear side door.

5. A side door assembly as set forth in claim 1 wherein said at least one hinge assembly further comprises a body side detent member mounted to said body side bracket and a door side detent member mounted to said hinge arm.

6. A side door assembly as set forth in claim 5 wherein said at least one hinge assembly further comprises a spring interconnecting said door side detent member and said hinge arm.

7. A vehicle comprising:

a vehicle body having a front end, a rear end, opposed sides, and a continuous door opening in at least one of said sides;

a front side door having a rear end and a forward end pivotally connected to said vehicle body at a front end of said door opening to open and close a front portion of said door opening;

a rear side door having a forward end and a rear end;

a plurality of hinge assemblies connected to said rear end of said rear side door and connected to said vehicle body at a rear end of said door opening and having a dual pivot to allow said rear side door to pivot to a first open position and a second open position and to a closed position relative to a rear portion of said door opening;

wherein each of said hinge assemblies comprises a door bracket mounted to said rear side door, a body side bracket mounted to the rear pillar, a body side cam mounted to said body side bracket, a door side cam mounted to said door side bracket, a hinge arm interconnecting said body side cam and said door side cam, a body side member pivotally connected to one end of said hinge arm and a door side member pivotally connected to another end of said hinge arm.

8. A vehicle as set forth in claim 7 including a rigid control member interconnecting said body side member and said door side member.

9. A vehicle as set forth in claim 7 wherein said body side member includes a projection cooperating with said body side cam to block and activate a first pivot for said rear side door.

10. A vehicle as set forth in claim 7 wherein said door side member includes a projection cooperating with said door side cam to block and activate a second pivot for said rear side door.

11. A vehicle as set forth in claim 7 wherein each of said hinge assemblies further comprises a body side detent member mounted to said hinge arm and a door side detent member mounted to said hinge arm.

* * * * *